(12) United States Patent
Taniguchi

(10) Patent No.: US 9,577,497 B2
(45) Date of Patent: Feb. 21, 2017

(54) ROTATING ELECTRIC MACHINE HAVING A MAGNETIC SENSOR THAT DETECTS A ROTATION POSITION OF A ROTOR CORE

(71) Applicant: DENSO CORPORATION, Kariya, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 411 days.

(21) Appl. No.: 14/187,610

(22) Filed: Feb. 24, 2014

(65) Prior Publication Data

US 2014/0246958 A1    Sep. 4, 2014

(30) Foreign Application Priority Data

Mar. 4, 2013    (JP) ................. 2013-041823

(51) Int. Cl.
| | |
|---|---|
| *H02K 11/00* | (2016.01) |
| *H02K 21/14* | (2006.01) |
| *H02K 29/08* | (2006.01) |
| *H02K 1/27* | (2006.01) |

(52) U.S. Cl.
CPC .......... *H02K 11/0021* (2013.01); *H02K 11/01* (2016.01); *H02K 11/215* (2016.01); *H02K 21/14* (2013.01); *H02K 29/08* (2013.01); *H02K 1/2746* (2013.01); *H02K 2201/03* (2013.01)

(58) Field of Classification Search
CPC ... H02K 11/0021; H02K 11/01; H02K 11/215; H02K 21/14; H02K 1/2746; H02K 29/08
USPC ........................................................ 310/68 B
See application file for complete search history.

(56) References Cited

U.S. PATENT DOCUMENTS

| | | | |
|---|---|---|---|
| 2010/0148612 A1* | 6/2010 | Takemoto | H02K 1/276 310/156.53 |
| 2012/0031697 A1* | 2/2012 | Matsuda | H02K 29/08 318/400.39 |
| 2012/0161590 A1 | 6/2012 | Yamasaki et al. | |

FOREIGN PATENT DOCUMENTS

| | | | | |
|---|---|---|---|---|
| JP | 6-13379 | 2/1994 | | |
| JP | 11-289743 | 10/1999 | | |
| JP | 11289743 A | * 10/1999 | ........... | H02K 41/035 |
| JP | 2012-244706 | 12/2012 | | |
| JP | 2012244706 A | * 12/2012 | ............. | H02K 11/00 |

OTHER PUBLICATIONS

Machine translation of JP 2012244706 A (Dec. 2012).*

(Continued)

*Primary Examiner* — Michael Andrews
(74) *Attorney, Agent, or Firm* — Nixon & Vanderhye P.C.

(57) ABSTRACT

A rotating electric machine has a semiconductor magnetic sensor and a cylindrical housing with a cylinder part, which is made of a soft magnetic material, positioned closer to the semiconductor magnetic sensor relative to a back yoke of a stator core. The semiconductor magnetic sensor is positioned away from the cylindrical housing so that a shortest distance between a center of the semiconductor magnetic sensor and the cylindrical housing is equal to or greater than 50 times of a sum of a first space distance and a second space distance. With such an arrangement, a leak magnetic field generated by magnetic poles that leaks in an axial direction is prevented from disturbing the semiconductor magnetic sensor. Thus, a rotation position detection accuracy of the semiconductor magnetic sensor is improved.

14 Claims, 10 Drawing Sheets

(56) References Cited

OTHER PUBLICATIONS

Machine translation of JP 11289743 A (Oct. 1999).*
Office Action (1 page) dated Feb. 24, 2015, issued in corresponding Japanese Application No. 2013-041823 and English translation (2 pages).

* cited by examiner

ROTATING ELECTRIC MACHINE HAVING A MAGNETIC SENSOR THAT DETECTS A ROTATION POSITION OF A ROTOR CORE

CROSS-REFERENCE TO RELATED APPLICATION

The present application is based on and claims the benefit of priority of Japanese Patent Application No. 2013-41823 filed on Mar. 4, 2013, the disclosure of which is incorporated herein by reference.

TECHNICAL FIELD

The present disclosure generally relates to a rotating electric machine having a magnetic sensor which detects a rotation position of a rotor core.

BACKGROUND

In recent years, the resolver of a rotating electric machine (i.e., a motor) has been gradually replaced by a rotation position detector. Within a rotation position detector, the magneto-resistive element of a magnetic sensor detects a rotation position of a rotor core. For example, a patent document 1 (i.e., Japanese Patent Laid-Open No. 2012-152091) discloses a rotation position detector that is a combination of a semiconductor magnetic sensor and a detection magnet that is attached to a rotation shaft that supports a rotor core. The semiconductor magnetic sensor outputs a signal according to the magnetic field of the detection magnet, which changes as the rotation shaft rotates. In comparison to the resolver, the rotation position detector provides a combination of (i) a semiconductor magnetic sensor which is an electronic part and (ii) a detection magnet. Further, in comparison to the resolver, which is a voluminous structural part, the rotation position detector has a smaller volume, which improves installability and motor assembly.

However, the detection accuracy of the resolver may deteriorate under the influence or disturbance of a foreign magnetic field (i.e., a disturbing magnetic field). Further, due to the structure, the resolver may easily be influenced by the disturbing magnetic field, which deteriorates detection accuracy. That is, because the resolver is equipped with a magnetic field collecting iron core with which the magnetic field/flux from a magnetic field generation part is collected), the magnetic sensor of the rotation position detector, which serves as a detecting element for detecting the magnetic field and does not include a magnetic field collecting iron core, may be easily influenced by the disturbing magnetic field, which deteriorates detection accuracy.

Since the detection magnet of the rotation position detector generates only a small magnetic field compared with a magnetic pole magnet, which is attached to the rotor core, the magnetic field leaked from the magnetic pole magnet will influence the magnetic sensor as a disturbance. In addition, the disturbance of the detection magnet is more noticeable, because, in recent years, the magnetic pole magnet is made of a rare earth permanent magnet.

As such, when the detection accuracy of the rotation position is low, an electric current supplied for a stator conductor of the rotating electric machine may have a harmonic generated therein, which may cause an uneven rotation or the like. Therefore, when the rotating electric machine uses a magnetic sensor, it is desirable for the rotating electric machine to have a configuration in which the magnetic sensor is not influenced by the magnetic field that is generated by the magnetic pole magnet of the rotor.

SUMMARY

It is an object of the present disclosure to provide a rotating electric machine that has improved rotation position detection accuracy when the machine is configured to use a magnetic sensor.

The rotating electric machine in the present disclosure includes a rotation shaft, a rotor core fixed on the rotation shaft, a plurality of magnetic poles extending radially outward from the rotor core, and a plurality of soft magnetic poles extending radially outward from the rotor core at positions between the plurality of magnetic poles. A plurality of teeth extend radially inward to face the plurality of magnetic poles and the plurality of soft magnetic poles and a cylindrical back yoke is connected to each of radial outside ends of the plurality of teeth. A first housing fixes the cylindrical back yoke relative to the rotation shaft. A stator conductor is positioned between each of the plurality of teeth. A detection magnet is fixed on one end of the rotation shaft and generating a magnetic field to indicate a rotation position of the rotor core. A magnetic sensor faces the detection magnet, detects the magnetic field, and outputs a signal according to the magnetic field as the rotation shaft rotates. When (i) a radial distance of a space between magnetic poles and the plurality of teeth is designated as a first space distance, (ii) a radial distance of a space between soft magnetic poles and the plurality of teeth is designated as a second space distance, and (iii) a consequential component is positioned a shortest distance from a center of the magnetic sensor, and the consequential component is defined as one of the cylindrical back yoke or the first housing, the shortest distance between the center of the magnetic sensor and the consequential component is equal to or greater than 50 times of a sum of the first space distance and the second space distance.

Here, a radial distance of a space between the magnetic poles and the teeth is designated as a first space distance, and a radial distance of a space between the soft magnetic poles and the teeth is designated as a second space distance. Further, a "consequential component" is defined as a component that is located at a nearest position to the center of the magnetic sensor from among (i) a back yoke and (ii) a cylinder part of a cylindrical housing which is used to fix the back yoke relative to the rotation shaft.

The feature of the present disclosure is that a shortest distance between a center of the magnetic sensor and the consequential component is equal to or greater than 50 times of a sum of the first space distance and the second space distance.

More concretely, if the first space distance is $\delta 1$ and the second space distance is $\delta 2$, a rotating electric machine having $\delta 1 = 0.6$ mm and $\delta 2 = 0.6$ mm is configured to position the magnetic sensor so that the shortest distance from the magnetic sensor to the consequential component is equal to or greater than 60 mm. Further, a rotating electric machine having $\delta 1 = 0.8$ mm and $\delta 2 = 0.5$ mm is configured to position the magnetic sensor so that the shortest distance from the magnetic sensor to the consequential component is equal to or greater than 65 mm.

In such configuration, a leak magnetic field which is generated by the magnetic pole magnet to leak in the axial direction is prevented from acting on the magnetic sensor as a disturbing magnetic field, and the rotation position detection accuracy of the magnetic sensor is improved.

BRIEF DESCRIPTION OF THE DRAWINGS

Other objects, features and advantages of the present disclosure become more apparent from the following detailed description disposed with reference to the accompanying drawings, in which.

DETAILED DESCRIPTION

Figure 1:
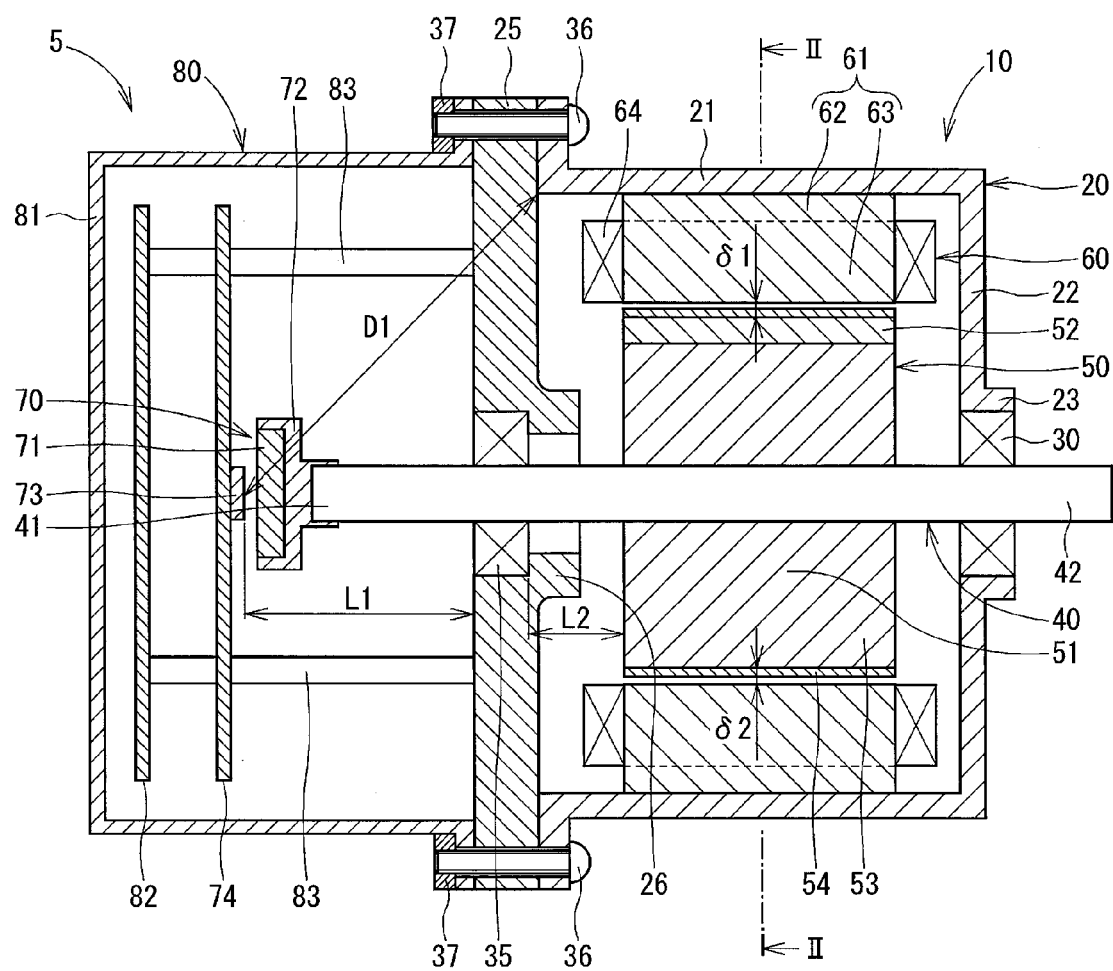
FIG. 1 is a longitudinal cross section of a drive unit of a motor in a first embodiment of the present disclosure.

Hereafter, embodiments of the present disclosure are described with reference to the drawing. Like parts have like numbers in all drawings, and description of the same parts will not be repeated in the specification.

COMPARATIVE EXAMPLES

Figure 10:
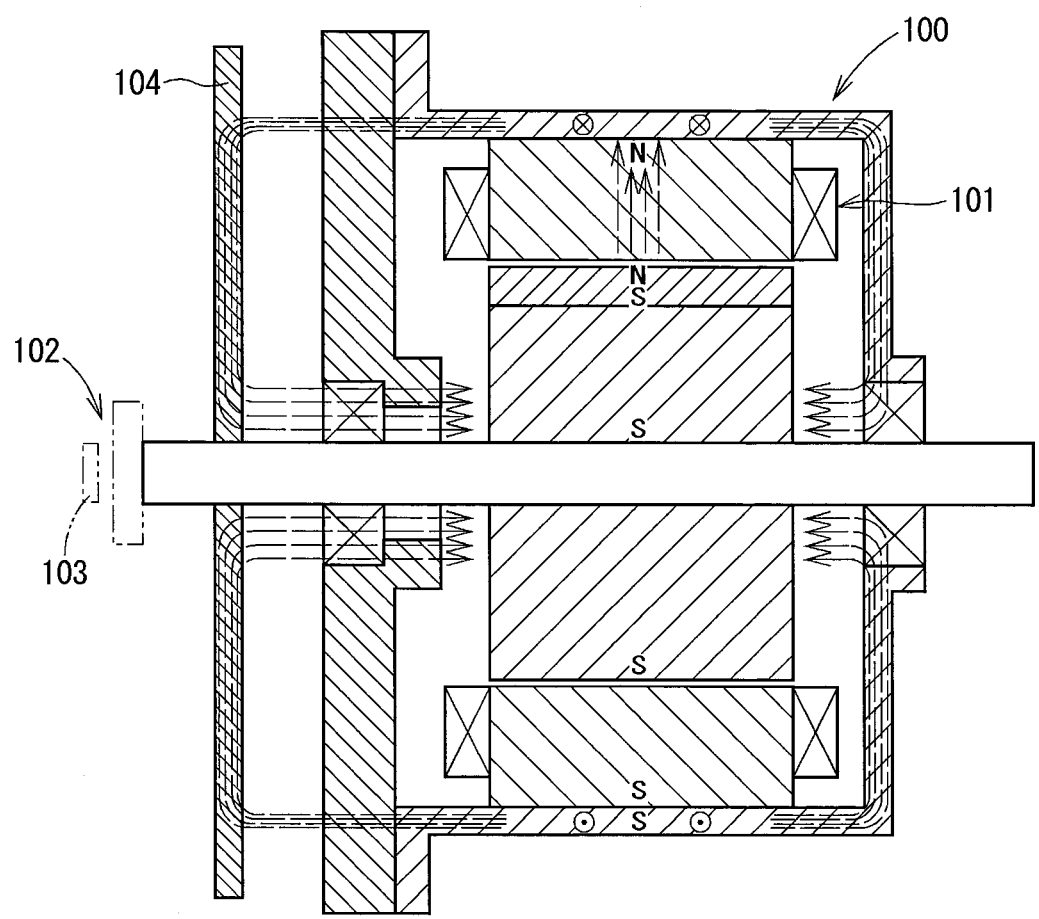
FIG. 10 is an illustration of a first comparative example of a motor depicting a flow of a magnetic flux in a configuration that has a shield member provided between a stator core of the motor and a semiconductor magnetic sensor.

As a first comparative example in regards to the above-described problem as shown in FIG. 10, a stator and a rotor of a rotating electric machine 100 may be covered by a magnetic member. Alternatively, a shield member 104 may be positioned to interpose between a stator 101 and a semiconductor magnetic sensor 103 of a rotation position detector 102. However, such a configuration is not economical because due to an increased volume and an increased number of components of the machine 100.

In recent years, the rotating electric machine provided with a consequent-pole type rotor, which intends to reduce the use of the rare earth permanent magnet, suffers from the disturbing magnetic field that is generated by the magnetic pole magnet and disturbs the magnetic sensor.

Figure 11:
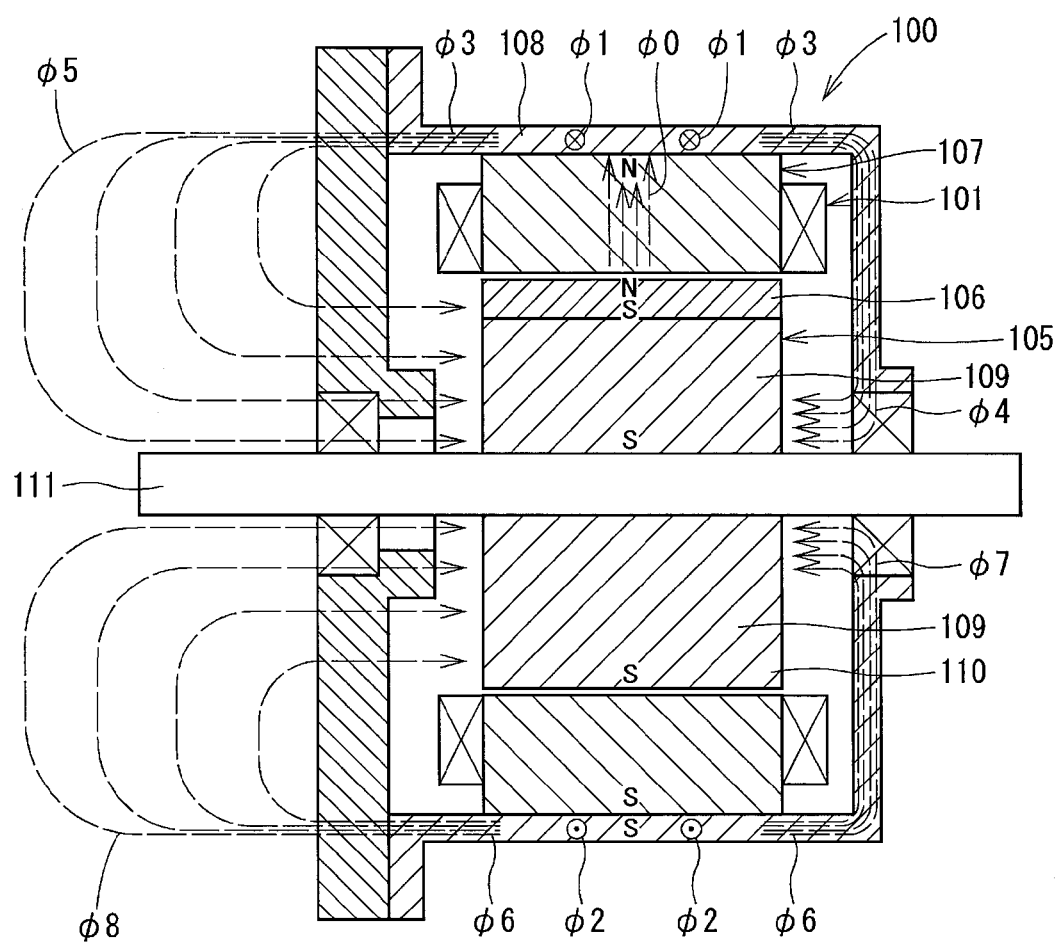
FIG. 11 is an illustration of a second comparative example of a motor depicting a flow of a magnetic flux in the motor.

As a second comparative example shown in FIG. 11, a flow of magnetic flux generated by a magnetic pole magnet 106 in the rotating electric machine 100 is provided with a consequent-pole type rotor 105. The magnetic flux φ0 generated by the magnetic pole magnet 106 will reach an iron case 108, on which the stator core 107 is fixed, after passing through a stator core 107. The magnetic flux which has reached the iron case 108 then flows substantially into two ways, i.e., in a radially outward direction and circling within the iron case 108, which is shown as magnetic fluxes φ1, φ2, and an axial direction that runs parallel with the shaft of the rotating electric machine 100 to flow within the iron case 108, which is shown as a magnetic flux φ3. One of two flows of the magnetic flux φ3 comes down to a bottom of the iron case 108, which is now designated as a magnetic flux φ4, and returns to a rotor core 109 that is magnetized to an S pole after flowing through the bottom of the iron case 108. The other one of the two-flow flux φ3 flows from an end of a cylinder part of the iron case 108 into the air, which is now designated as a magnetic flux φ5, and returns to the rotor core 109 after a turn in the air.

On the other hand, after the magnetic flux φ2 circles within the iron case 108 and reaches a radial distance greater than a soft magnetic pole 110, circling, the magnetic flux φ2 is repelled by the soft magnetic pole 110 that is magnetized as an S pole, and turns into a magnetic flux φ6 which flows through the iron case 108 in an axial direction. The magnetic flux φ6 which has flowed into one axial direction returns to the rotor core 109, after turning into a magnetic flux φ7 which passes through the bottom of the iron case 108. The magnetic flux φ6 flowing into the other axial direction turns into a magnetic flux φ8, and also returns to the rotor core 109, after flowing into the air from an end face of the cylinder part of the iron case 108 and after a turn in the air.

Therefore, in consideration of the magnetic fluxes φ5 and φ8, which are leak magnetic fields to act as a disturbing magnetic field, it is not preferable to have a magnetic sensor arranged at a position that is close to a rotation shaft end 111.

Figure 12:
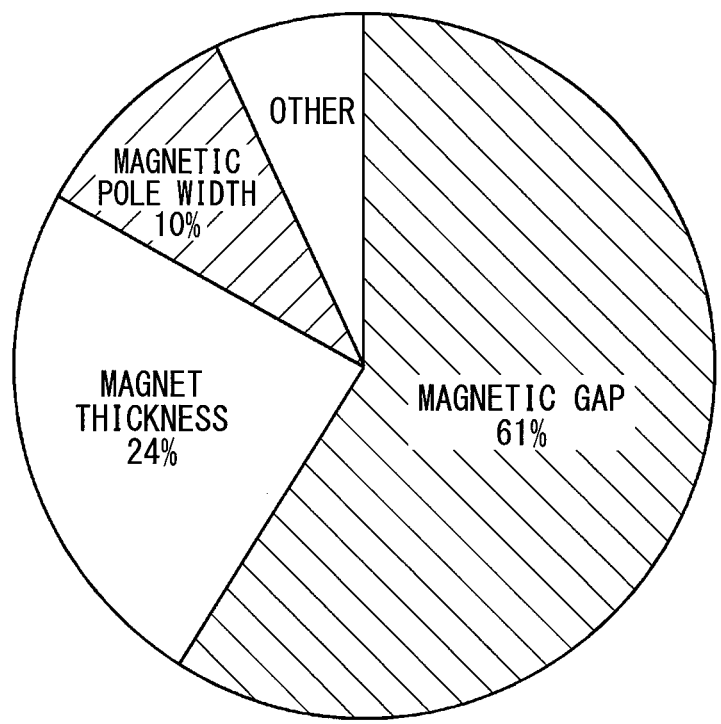
FIG. 12 is a pie chart of an analysis result regarding disturbance factors by which a rotation position detection accuracy by using a semiconductor magnetic sensor is deteriorated in a rotating electric machine provided with a consequent-pole type rotor.

As a result, analysis regarding what is a disturbance factor that deteriorates the detection accuracy of the rotation position detected by a magnetic sensor in a rotating electric machine that is provided with a consequent-pole type rotor, has determined that a magnetic gap (i.e., a space between teeth of the stator core and the magnetic pole of the rotor), has an effect on such deterioration. That is, as shown in FIG. 12, among many disturbance factors by which the rotation position detection accuracy by using a magnetic sensor is deteriorated, the size of the magnetic gap contributes no less than 60%. In other words, an intensity of the leak magnetic field generated by the magnetic pole magnet to leak in the axial direction largely depends upon the size of the magnetic gap. If the size of the magnetic gap is large, the leak magnetic field will not be reduced in a major way even when the thickness of the magnet is reduced for reducing the intensity of the magnetic field.

Therefore to counter the above-described findings, the rotating electric machine in the present disclosure defines a relationship between (i) a dimension of the rotating electric machine and (ii) a detection accuracy of the rotation position by using the magnetic sensor.

First Embodiment

A drive unit, to which a motor that serves as a "rotating electric machine" in the first embodiment of the present disclosure is applied, is shown in FIG. 1. A drive unit 5 is used as a power source of an electric power steering device for a vehicle. First, an outline configuration of the drive unit 5 is explained based on FIGS. 1 and 2. The drive unit 5 is an integral-type drive unit in which a motor 10 and a controller 80 for controlling the motor 10 are installed in one body.

The motor 10 is a three-phase-circuit brushless motor, and is provided with a cylindrical housing 20, a bearing plate 25, a bearing 30, a bearing 35, a rotation shaft 40, a rotor 50, a stator 60, and a rotation position detector 70.

The cylindrical housing 20 is a low carbon rolled steel plate, which is a press-mold article, and has a cylinder part 21 and a bottom part 22 which covers one end of the cylinder part 21. The bottom part 22 forms a bearing support part 23 that supports the bearing 30.

The bearing plate 25 is a component made by aluminum die-casting, and it is fixed onto the cylindrical housing 20 so that the other end part of the cylinder part 21 of the cylindrical housing 20 is covered by it. According to the present embodiment, the cylindrical housing 20, the bearing plate 25, and a cover 81 mentioned below are fastened together by a bolt 36 and a nut 37. The bearing plate 25 forms a bearing support part 26 that supports the bearing 35.

The rotation shaft 40 is rotatably supported by the bearings 30 and 35, and an end 41 of the shaft 40 extends into an inside of the cover 81. An end 42 of the rotation shaft 40, which is an opposite end relative to the end 41, is an output end of the drive unit 5, and extends to protrude from the cylindrical housing 20.

The rotor 50 is a permanent field magnet of the motor 10, and has a rotor core 51, plural magnetic poles 52, plural soft magnetic poles 53, and a thin-walled cover 54. The rotor core 51 has a cylindrical shape, and is press-fitted onto the rotation shaft 40 in the cylindrical housing 20. The rotor core 51 and the soft magnetic poles 53 are made of the same material, and are formed as a layered product of the magnetic steel plates. The soft magnetic poles 53 project radially outward (i.e., a direction from a center of the rotation shaft 40 toward a periphery of the rotor 50) from the rotor core 51.

Figure 2:
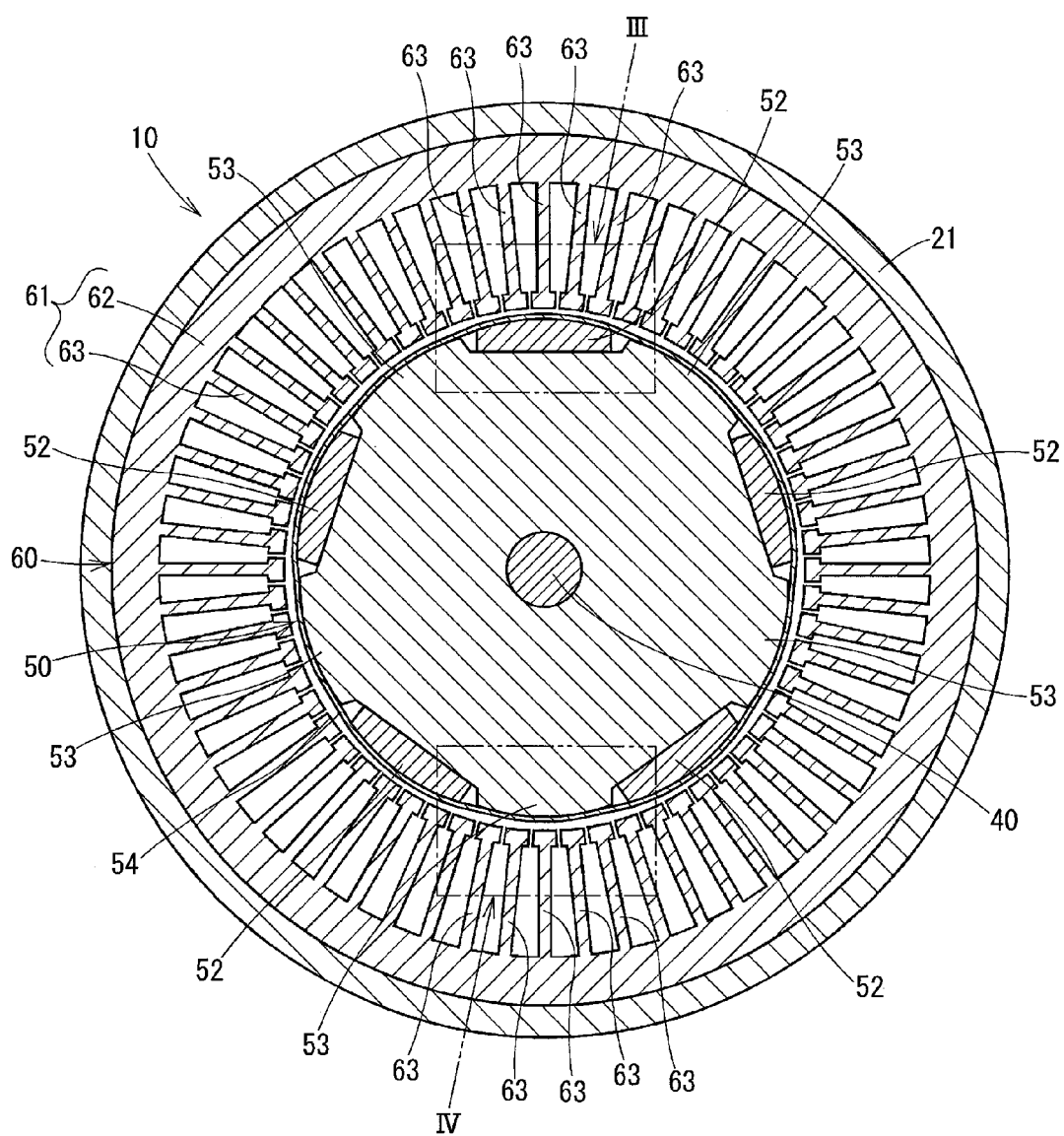
FIG. 2 is a cross section along line II-II of FIG. 1.
Figure 3:
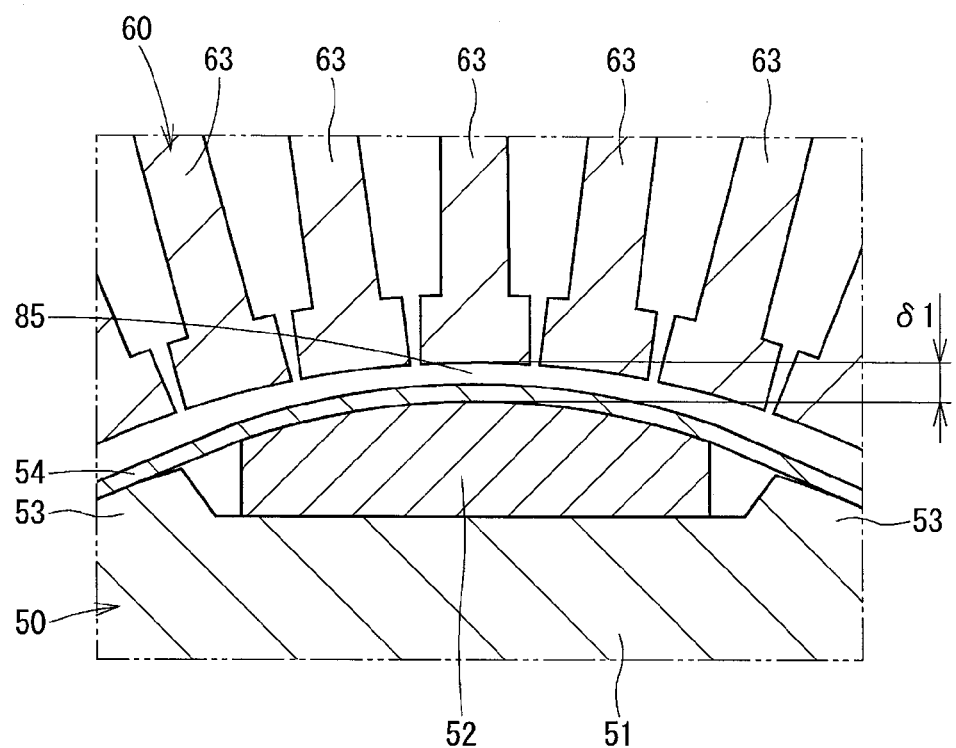
FIG. 3 is an enlarged view of an arrow III portion of FIG. 2.
Figure 4:
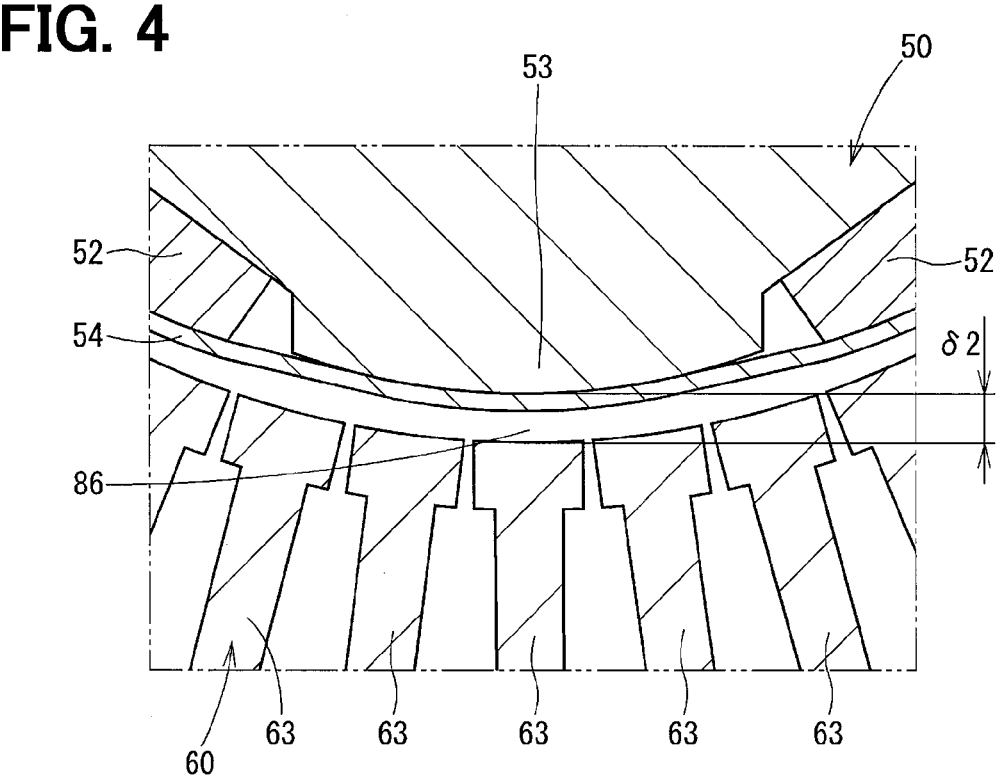
FIG. 4 is an enlarged view of an arrow IV portion of FIG. 2.
Figure 5:
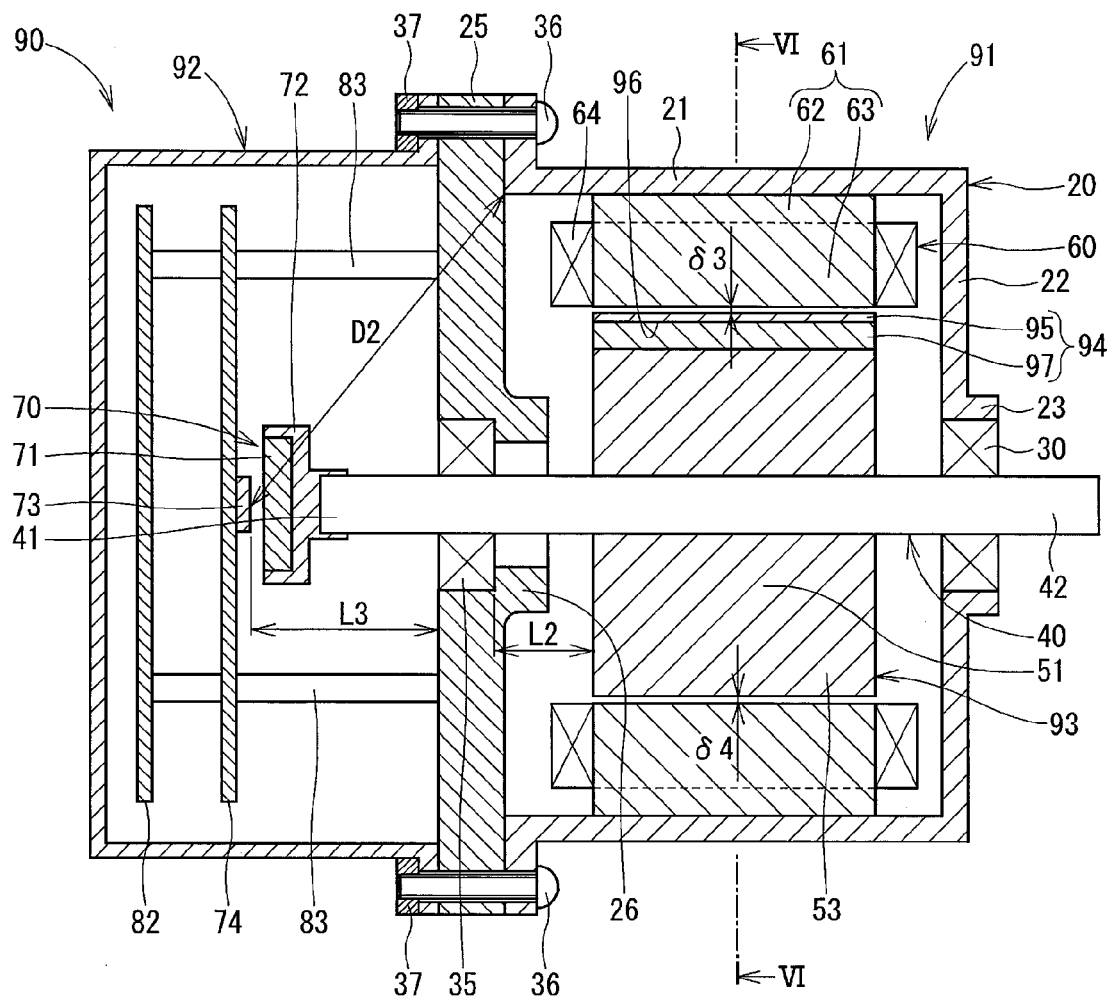
FIG. 5 is a longitudinal cross section of the drive unit of the motor in a second embodiment of the present disclosure.
Figure 6:
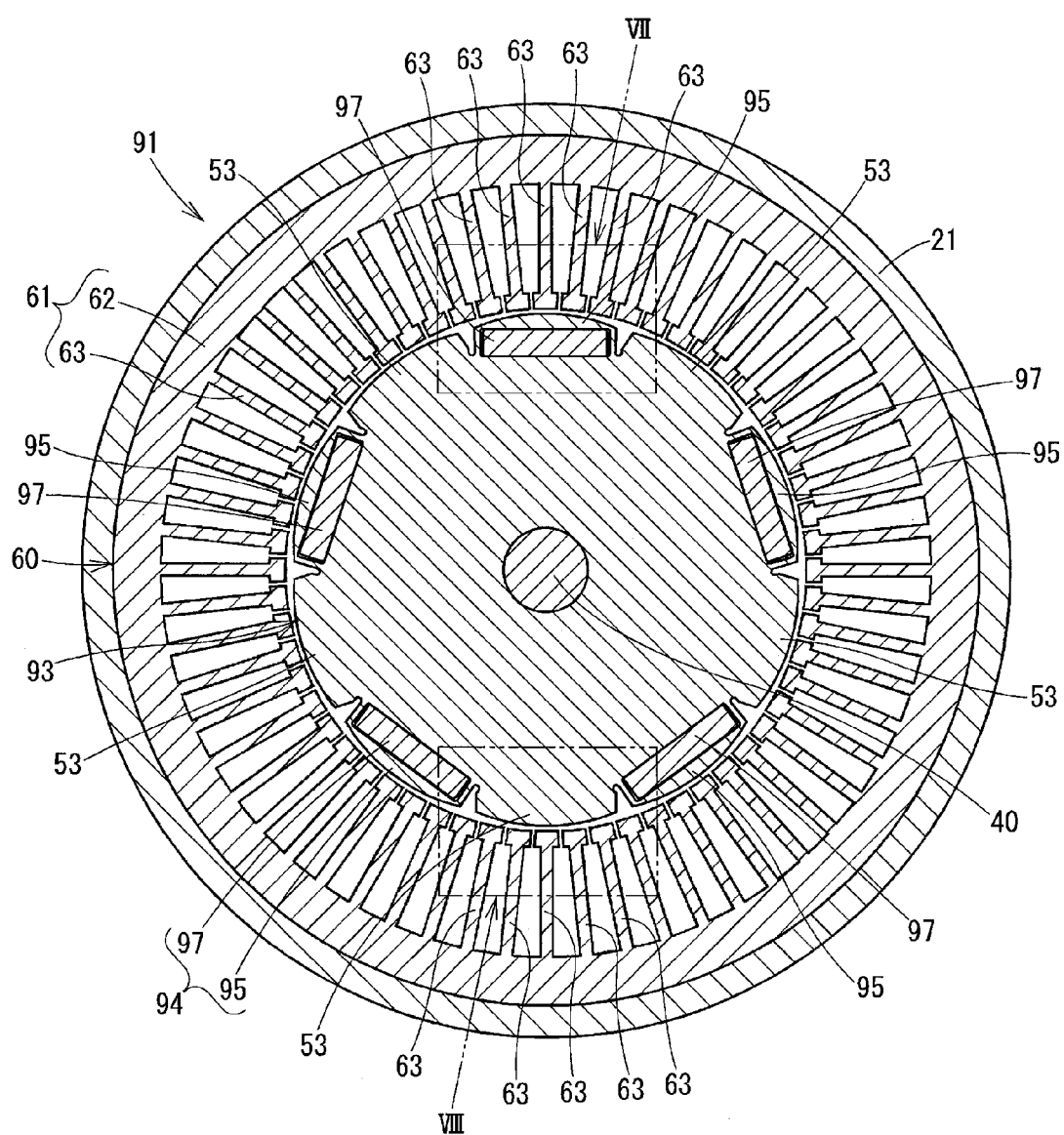
FIG. 6 is a VI-VI line cross section of FIG. 5.
Figure 7:
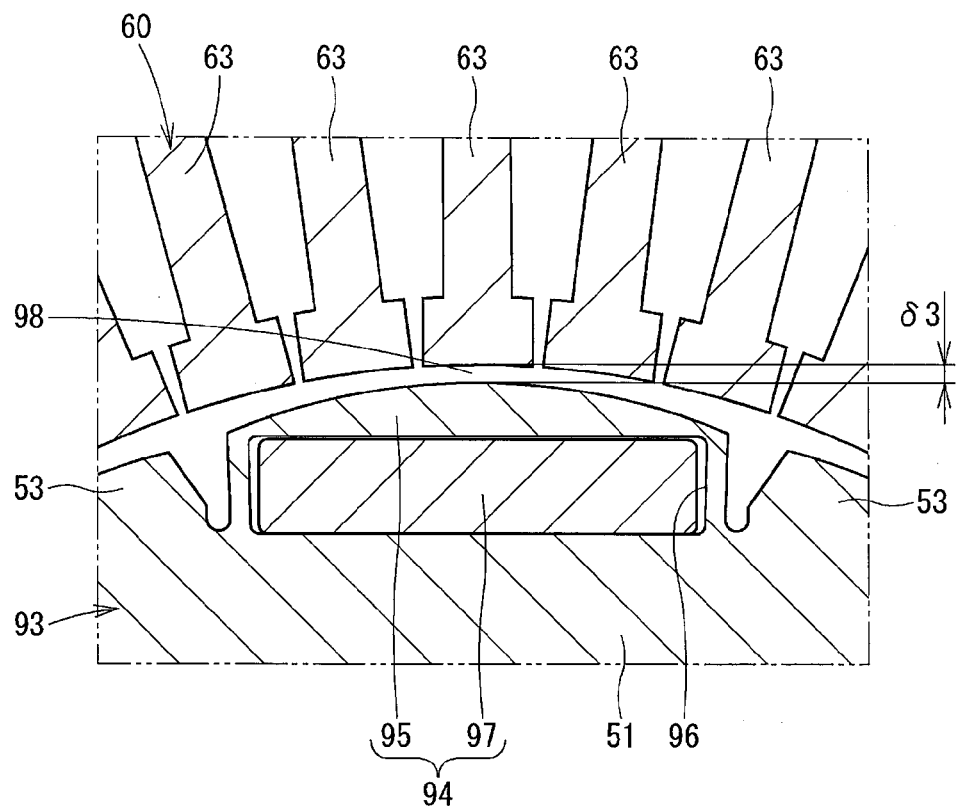
FIG. 7 is an enlarged view of an arrow VII portion of FIG. 6.
Figure 8:
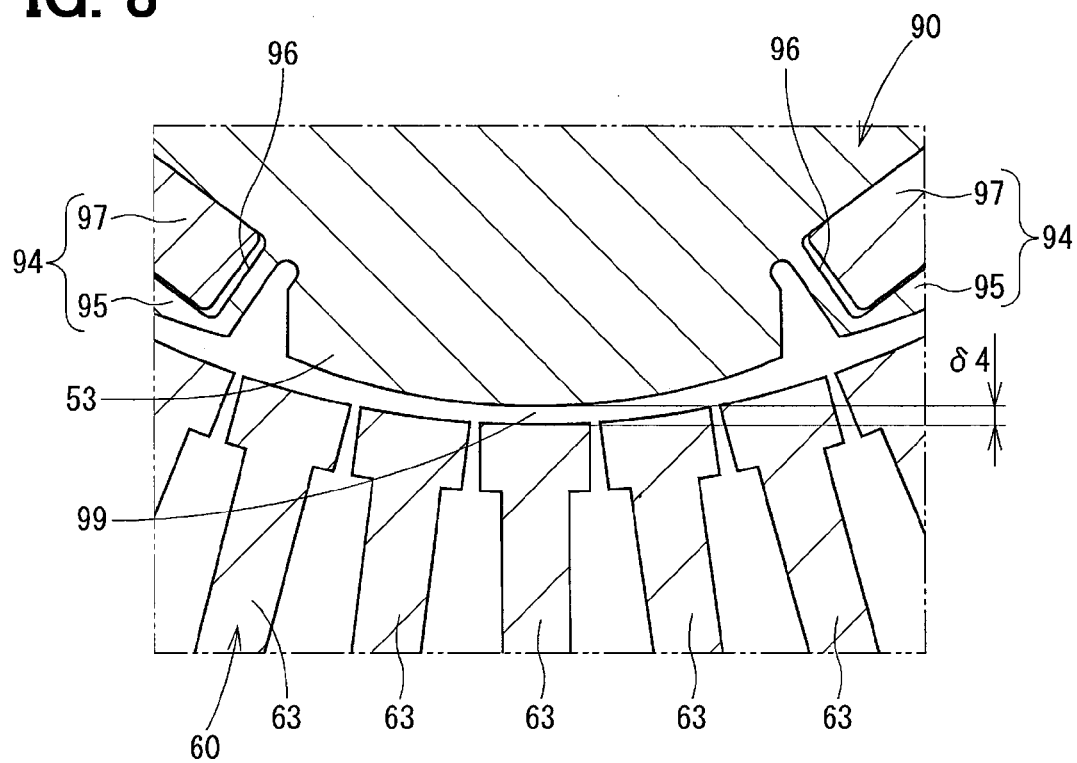
FIG. 8 is an enlarged view of an arrow VIII portion of FIG. 6.

The magnetic poles 52 are made from a neodymium magnet, and each magnetic poles 52 is positioned between two soft magnetic poles 53, such that the magnetic poles 52 and soft magnetic poles 53 are alternatingly positioned around the rotor 50, as shown in FIG. 2. In each of the magnetic poles 52, the magnetizing direction is aligned with the radial direction (i.e., a direction from a rotational center toward a periphery) of the motor 10, which enables that radial outside surfaces of all of the plural magnetic poles are uniformly magnetized to have the same polarity, i.e., uniformly as N poles or as S poles. The thin-walled cover 54 which is made of a non-magnetic material is fittingly disposed on an outside of the magnetic poles 52 and the soft magnetic poles 53, for the prevention of scattering of the magnetic poles 52, etc.

The rotor 50 is a consequent-pole type rotor in which the magnetic poles 52 and the soft magnetic poles 53 are alternatingly arranged along a periphery of the rotor 50. According to the present embodiment, the number of the magnetic poles of the rotor 50 is ten, and the magnetic poles 52 and the soft magnetic poles 53 are symmetrically arranged around the rotation shaft 40 in a circumferential direction.

The stator 60 is an armature of the motor 10, and is provided on the radial outside (i.e., an outside/periphery) to the rotor 50. In other words, the stator surrounds the rotor. The motor 10 is an inner-rotor type motor. The stator 60 has a stator core 61 and a winding 64. The stator core 61 is made of a layered product of the magnetic steel plate and sheet, and includes a cylindrical back yoke 62 that is inserted into the cylindrical housing 20 to be fitted against an inner wall of the cylinder part 21 and a plurality of teeth 63 that radially extend toward a radial inside from the back yoke 62. In other words, the plurality of teeth 63 extend radially inward to face the plurality of magnetic poles 52 and the plurality of soft magnetic poles 53. The winding 64 is an equivalent of a "stator conductor" in claims, and is made from a U phase winding, a V phase winding, and a W phase winding. Each of the windings 64 is wound around a slot between two teeth 63. In the present embodiment, the winding 64 is wound by a full-pitch winding. The winding 64 is electrically connected to an external power supply via a power cable (not illustrated). Illustration of the winding 64 is also omitted in FIG. 2.

The rotation position detector 70 detects a rotation position of the rotation shaft 40, and, at the same time, detects a rotation position of the magnetic pole of the rotor 50. The rotation position detector 70 includes a detection magnet 71 and a semiconductor magnetic sensor 73. The detection magnet 71 is attached to the end 41 of the rotation shaft 40 via an attachment component 72, and generates a magnetic field for rotation position detection. According to the present embodiment, the detection magnet is a pillar type magnet, and its magnetizing direction is in line with the radial direction.

On an opposite side of the stator 60 relative to the detection magnet 71, the semiconductor magnetic sensor 73 is positioned, and the center of the semiconductor magnetic sensor 73 is substantially in agreement with the center of the shaft, and the semiconductor magnetic sensor 73 is attached to a control board 74. According to the present embodiment, the semiconductor magnetic sensor 73 has a magneto-resistive element which is sensitive to a magnetic field that is in parallel with a magnet-sensitive surface. The magneto-resistive element outputs a signal according to a magnitude of the internal resistance which changes as the rotation shaft 40 rotates. The semiconductor magnetic sensor 73 detects a rotation position of the magnetic pole of the rotor 50 based on the signal inputted from the magneto-resistive element, and outputs the detection result to the controller 80.

The controller 80 is provided with a cover 81 and a main circuit board 82. The cover 81 is formed in a shape of a cylinder having a bottom. A top opening of the cover 81 is fixed onto the bearing plate 25. The main circuit board 82 is fixed onto the bearing plate 25 together with the control board 74 by using a stud 83. The main circuit board 82 generates a rotating magnetic field which rotates about the center of the shaft by switching energization of the winding 64 of each phase one by one according to the signal inputted from the semiconductor magnetic sensor 73 (i.e., according to the rotation position of the magnetic pole of the rotor 50). The rotor 50 rotates in response to a pull from the above-mentioned rotating magnetic field.

The cylinder part 21 of the cylindrical housing 20 is disposed on the radial outside relative to the stator 60 and the rotor 50, and is an equivalent of a "first housing" in claims. The bearing plate 25 supports the rotation shaft 40 via the bearing 35 at a position between (i) the stator 60 and the rotor 50 and (ii) the detection magnet 71, and is an equivalent of a "second housing" in claims. The bottom part 22 of the cylindrical housing 20 supports the rotation shaft 40 via the bearing 30 on an opposite side, and is an equivalent of a "third housing" in claims.

Next, the feature configuration of the drive unit 5 is explained based on FIGS. 1 to 4.

In the present embodiment, a "consequential component" is defined as a component located at a nearest position to the center of the semiconductor magnetic sensor 73 from among (i) the back yoke 62 of the stator core 61 and (ii) the cylinder part 21 of cylindrical housing 20 for fixing the back yoke 62 relative to the rotation shaft 40. If a radial direction shortest distance of a space 85 between the magnetic poles 52 and the teeth 63 is designated as a first space distance δ1 and a radial direction shortest distance of a space 86 between the soft magnetic poles 53 and the teeth 63 is designated as a second space distance δ2, a shortest distance D1 between the center of the semiconductor magnetic sensor 73 and the cylindrical housing 20 is set to be equal to or greater than 50 times the sum of the first space distance δ1 and the second space distance δ2.

An axial direction interspace L1 between the bearing 35 and the semiconductor magnetic sensor 73, which is a distance between the bearing 35 and the sensor 73 along the axial direction of the motor 10, is set up to be greater than an axial direction interspace L2 between the bearing 35 and the rotor core 51, which is a distance between the bearing 35 and the rotor core 51 along the axial direction of the motor 10. According to the present embodiment, the axial direction interspace L1 is set to be equal to or greater than 1.5 times of the axial direction interspace L2.

As explained above, in the present embodiment, the cylinder part 21 of the cylindrical housing 20, which is made of the rolled steel plates, is in a position closer to the semiconductor magnetic sensor 73 in comparison to the back yoke 62 of the stator core 61. The semiconductor magnetic sensor 73 is separated from the cylindrical housing 20 so that the shortest distance D1 between the center of the semiconductor magnetic sensor 73 and the cylindrical housing 20 is equal to or greater than 50 times of the sum of the first space distance δ1 and the second space distance δ2. Therefore, such structure prevents the leak magnetic field, which is generated by the magnetic poles 52 and leaks in the axial direction, from acting on the semiconductor magnetic sensor 73 as a disturbing magnetic field, thereby enabling an improvement of the rotation position detection accuracy of the sensor 73. Further, by quantifying beforehand the relationship between the shortest distance D1, the first space distance δ1, and the second space distance δ2, a design work for designing a suitable magnetic circuit is improved, even when the specification of the drive unit 5 is changed.

Further, in the first embodiment, the cylindrical housing 20 and the bearing plate 25 are formed to be serving as housing of the rotor 50 and the stator 60. The bearing plate 25 is positioned between (i) the rotor core 51 and the stator core 61 and (ii) the semiconductor magnetic sensor 73, and, the various components of the controller 80 are attached onto the bearing plate 25 in addition to the control board 74 and the main circuit board 82. The bearing plate 25 is a product made by aluminum die-casting. The bearing plate 25 has high rigidity and high dimensional accuracy without performing additional processing. Therefore, the observed problems in the comparative examples, such as a lack of rigidity in the bearing plate 25 when the housing 25 is made of the rolled steel plates and/or an additional processing to have a high dimensional accuracy when the housing 25 is made of a cast iron, will be resolved. Further, since the bearing plate 25 is made of a nonmagnetic material and will not function as a magnetic shield, such aspect is further beneficial for the feature of the present embodiment, which is a prevention of the leak magnetic field from the magnetic poles 52 to act on the semiconductor magnetic sensor 73 as a disturbing magnetic field.

Furthermore, in the first embodiment, the bearing 35 is disposed at a position between the rotor core 51 and the detection magnet 71, and supports the rotation shaft 40. The axial direction interspace L1 between the bearing 35 and the semiconductor magnetic sensor 73 is set to be equal to or greater than 1.5 times of the axial direction interspace L2 between the bearing 35 and the rotor core 51. That is, the bearing 35 is arranged to be closer to the rotor core 51 rather than to the semiconductor magnetic sensor 73. Therefore, the bearing 35 is prevented from attracting/collecting the leak magnetic field of the magnetic poles 52 at a position close to the semiconductor magnetic sensor 73.

In the first embodiment, the motor 10 is for use in a vehicular electric power steering device, which is required to satisfy a very high standard of operation noise and vibration. However, by devising the above-described features and structures, the motor 10 is enabled to perform a highly accurate steering angle control.

Second Embodiment

The drive unit in the second embodiment of the present disclosure is explained based on FIGS. 5 to 8. A drive unit 90 is provided with a motor 91 and a controller 92. A rotor 93 of the motor 91 is a magnet embedded type rotor, and has a magnetic pole 94. The magnetic pole 94 includes a projection 95 which is made of the same material as the rotor core 51, a magnetic pole magnet 97 that is accommodated in a magnet accommodation hole 96 in the projection 95.

When the radial direction shortest distance of a space 98 between the magnetic pole 94 and the teeth 63 is designated as a first space distance δ3 and the radial direction shortest distance of a space 99 between the soft magnetic pole 53 and the teeth 63 is designated as a second space distance δ4, a shortest distance D2 between the center of the semiconductor magnetic sensor 73 and the cylindrical housing 20 is set to be equal to or greater than 50 times of the sum of the first space distance δ3 and the second space distance δ4. The first space distance δ3 is smaller than the first space distance δ1 of the first embodiment, and the second space distance δ4 is smaller than the second space distance δ2 of the first embodiment. Based on the above dimension, the shortest distance D2 may be set up to be smaller than the shortest distance D1 of the first embodiment.

An axial direction interspace L3 between the bearing 35 and the semiconductor magnetic sensor 73 is set up to be greater than the axial direction interspace L2 between the bearing 35 and the rotor core 51. According to the present embodiment, the axial direction interspace L3 is set up to be equal to or greater than 1.5 times of the axial direction interspace L2.

According to the second embodiment, just like the first embodiment, the devised structure sufficiently prevents the leak magnetic field, which is generated by the magnetic pole magnet 97 and leaks in an axial direction, from acting on the semiconductor magnetic sensor 73 as a disturbing magnetic field. In such manner, the rotation position detection accuracy of the sensor 73 is improved.

Further, since the shortest distance D2 of the second embodiment is set up to be smaller than the shortest distance D1 of the first embodiment, a volume of the drive unit 90 is reduced.

Third Embodiment

Figure 9:
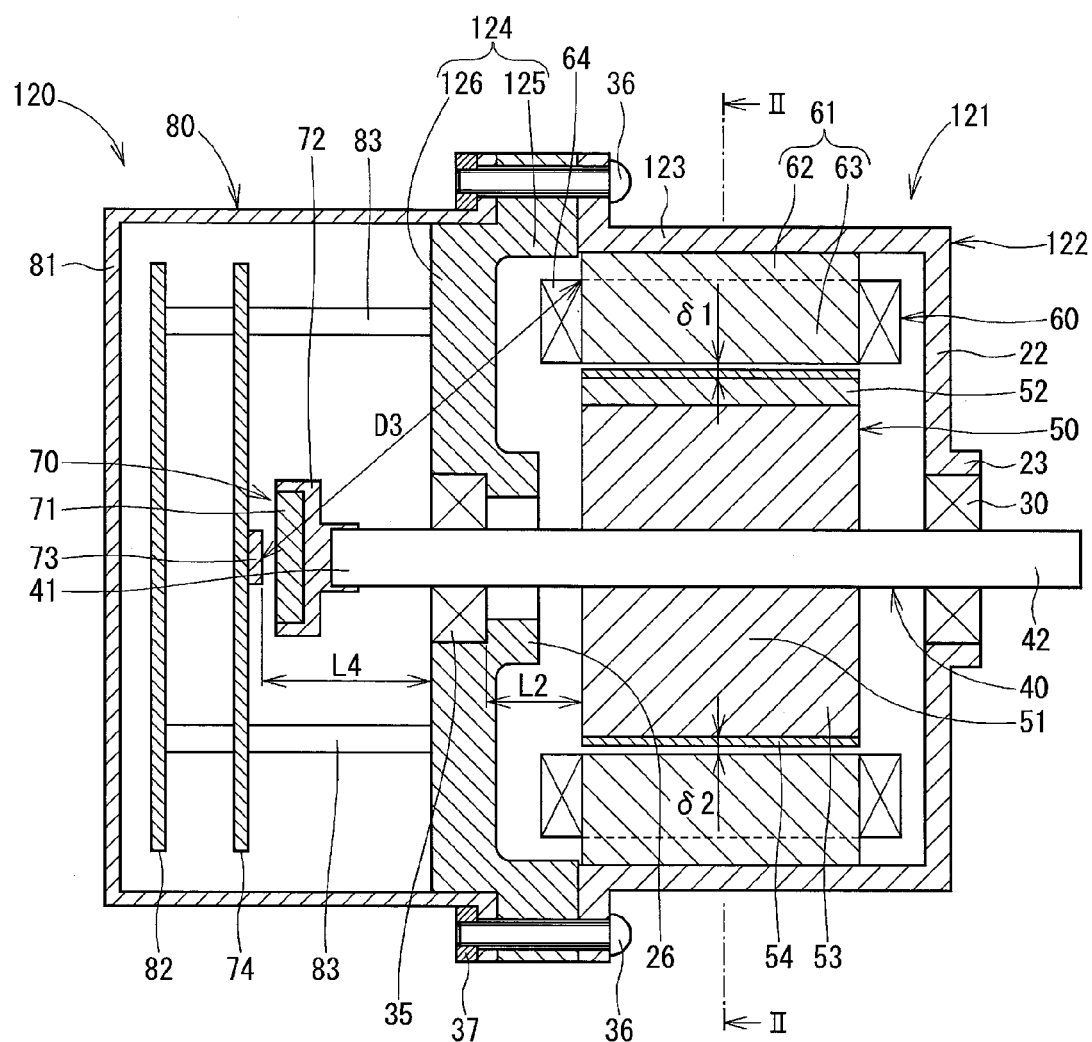
FIG. 9 is a longitudinal section of the drive unit of the motor in a third embodiment of the present disclosure.

The drive unit in the third embodiment of the present disclosure is explained based on FIG. 9. A motor 121 of a drive unit 120 is provided with a cylindrical housing 122 and a cylindrical housing 124. A cylinder part 123 of the cylindrical housing 122 has a shorter axial direction length in comparison to the cylinder part 21 of the cylindrical housing 20 of the first embodiment, and an end face of the cylinder part 123 on its opening side is positioned at a proximity of an end face of the back yoke 62. The cylindrical housing 124 replaces the bearing plate 25 of the first embodiment, and a cylinder part 125 projects from a bottom part 126 toward a cylindrical housing 122 side.

In the third embodiment, a "consequential component" is defined as a component located at a nearest position to the center of the semiconductor magnetic sensor 73 from among (i) the back yoke 62 of the stator core 61 and (ii) the cylinder part 123 of the cylindrical housing 122 for fixing the back yoke 62 relative to the rotation shaft 40. A shortest distance D3 between the center of the semiconductor magnetic sensor 73 and the back yoke 62 is set to be equal to or greater than 50 times of the sum of the first space distance δ1 and the second space distance δ2. The shortest distance D3 is smaller than shortest distance D1 of the first embodiment.

An axial direction interspace L4 between the bearing 35 and the semiconductor magnetic sensor 73 is set up to be greater than the axial direction interspace L2 between the bearing 35 and the rotor core 51. According to the present embodiment, the axial direction interspace L4 is set to be equal to or greater than 1.5 times of the axial direction interspace L2. The cover 81 of the controller 80 is being fitted to and fixed on the cylindrical housing 124.

According to the third embodiment, just like the first embodiment, the devised structure sufficiently prevents the leak magnetic field, which is generated by the magnetic pole magnet 97 and leaks in the axial direction, from acting on the semiconductor magnetic sensor 73 as a disturbing magnetic field. In such manner, the rotation position detection accuracy of the sensor 73 is improved.

Further, since the shortest distance D3 of the third embodiment is set up to be smaller than the shortest distance D1 of the first embodiment, a volume of the drive unit 120 is reduced.

Other Embodiments

In other embodiments of the present disclosure, the magnetic sensor may be not only a magneto-resistive element but also other type elements, such as a Hall element or the like, for example. In the other embodiments of the present disclosure, the number of poles in the motor may be other than ten. Further, the number of slots may be other than 60.

According to the other embodiments of the present disclosure, the winding of the stator may be wound not only as the full-pitch winding, but also as the short-pitch winding, the wave winding, the lap winding or the like.

In the other embodiments of the present disclosure, the magnetic pole magnet which is used in the magnetic poles may be not only a neodymium magnet but may also be other types of magnets.

In the other embodiments of the present disclosure, the magnetic pole magnet which is used in the magnetic poles and the detection magnet may be made from plural pieces of permanent magnet.

In the other embodiments of the present disclosure, the cylindrical housing may not only be a press-molded article of a low carbon rolled plate, but may also be a cast article or the like, for example.

In the other embodiments of the present disclosure, the iron core of the rotor and the stator may not only be the layered body of an electromagnetic plate, but may also be a single piece of a soft magnetic member.

In the other embodiments of the present disclosure, a motor may be used not only in the electric power steering device of a vehicle, but may also be used in other products, such as an industrial device, a household appliance, a hobby device, a teaching material or the like.

The present disclosure may be applicable not only to a motor but also to a generator.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A rotating electric machine comprising:
   a rotation shaft;
   a rotor core fixed on the rotation shaft;
   a plurality of magnetic poles extending radially outward from the rotor core;
   a plurality of soft magnetic poles extending radially outward from the rotor core at positions between the plurality of magnetic poles;
   a plurality of teeth extending radially inward to face the plurality of magnetic poles and the plurality of soft magnetic poles;
   a cylindrical back yoke connected to each of radial outside ends of the plurality of teeth;
   a first housing fixing the cylindrical back yoke relative to the rotation shaft;
   a stator conductor positioned between each of the plurality of teeth;
   a detection magnet fixed on one end of the rotation shaft and generating a magnetic field to indicate a rotation position of the rotor core; and
   a magnetic sensor facing the detection magnet, detecting the magnetic field, and outputting a signal according to the magnetic field as the rotation shaft rotates, wherein
   when (i) a radial distance of a space between magnetic poles and the plurality of teeth is designated as a first space distance, (ii) a radial distance of a space between soft magnetic poles and the plurality of teeth is designated as a second space distance, and (iii) a consequential component is positioned a shortest distance from a center of the magnetic sensor, and the consequential component is defined as one of the cylindrical back yoke or the first housing,
   the shortest distance between the center of the magnetic sensor and the consequential component is equal to or greater than 50 times of a sum of the first space distance and the second space distance.

2. The rotating electric machine of claim 1, further comprising:
   a second housing supporting the rotation shaft at a position between the rotor core and the magnetic sensor; and
   a third housing supporting the rotation shaft at an opposite position that is opposite to the second housing relative to the rotor core, wherein
   the first housing has a cylindrical shape and houses the cylindrical back yoke, and
   the second housing is made of a non-magnetic material.

3. The rotating electric machine of claim 2, wherein the consequential component is the first housing.

4. The rotating electric machine of claim 1, wherein the magnetic sensor includes a magneto-resistive element.

5. The rotating electric machine of claim 1, further comprising:

a projection of the magnetic pole projecting from the rotor core in the radial direction and having a magnet accommodation hole; and a magnetic pole magnet that is accommodated in the magnet accommodation hole.

6. The rotating electric machine of claim 1, further comprising:

a bearing supporting the rotation shaft at a position between the rotor core and the detection magnet, wherein an axial direction interspace between the bearing and the magnetic sensor is greater than an axial direction interspace between the bearing and the rotor core.

7. The rotating electric machine of claim 6, wherein the axial direction interspace between the bearing and the magnetic sensor is equal to or greater than 1.5 times the axial direction interspace between the bearing and the rotor core.

8. The rotating electric machine of claim 1, wherein the rotating electric machine is used in a vehicle electric power steering device.

9. The rotating electric machine of claim 1, wherein the consequential component includes a component located at a nearest position to the center of the magnetic sensor from one of the cylindrical back yoke or the first housing.

10. The rotating electric machine of claim 1, wherein the first space distance is a shortest distance in a radial direction defining of a space between the plurality of magnetic poles and the plurality of teeth.

11. The rotating electric machine of claim 1, wherein the second space distance is a shortest distance in the radial direction defining a space between the plurality of soft magnetic poles and the plurality of teeth.

12. The rotating electric machine of claim 1, wherein (i) the first space distance is a radial distance of a space between magnetic poles extending radially outward from the rotor core and the plurality of teeth located in a stator core, (ii) the second space distance is a radial distance of a space between soft magnetic poles extending radially outward from the rotor core and the plurality of teeth located in the stator, and (iii) the consequential component is positioned at the shortest distance from the center of the magnetic sensor to one of the cylindrical back yoke or the first housing.

13. The rotating electric machine of claim 1, wherein first space distance is 0.6 mm, the second space distance is 0.6 mm, and the shortest distance from the center of the magnetic sensor to the consequential component is equal to or greater than 60 mm.

14. The rotating electric machine of claim 1, wherein first space distance is 0.8 mm, the second space distance is 0.5 mm, and the shortest distance from the center of the magnetic sensor to the consequential component is equal to or greater than 65 mm.

* * * * *